United States Patent [19]

Miranti, Jr.

[11] 4,253,836
[45] Mar. 3, 1981

[54] MOBIUS BELT AND METHOD OF MAKING THE SAME

[75] Inventor: Joseph P. Miranti, Jr., Nixa, Mo.

[73] Assignee: Dayco Corporation, Dayton, Ohio

[21] Appl. No.: 75,490

[22] Filed: Sep. 14, 1979

[51] Int. Cl.³ .......................... F16G 1/08; F16G 5/06
[52] U.S. Cl. .................................. 474/200; 156/137; 474/262
[58] Field of Search ............... 474/200, 263, 264, 262; 156/137, 138, 139, 140, 141, 142

[56] References Cited

U.S. PATENT DOCUMENTS

| | | | |
|---|---|---|---|
| 1,442,682 | 1/1923 | De Forest | 274/41.6 R |
| 2,479,929 | 8/1949 | Harris | 51/41 |
| 2,784,834 | 3/1957 | Trinkle | 198/854 |
| 2,983,637 | 5/1961 | Schmidt | 156/138 |
| 3,078,206 | 2/1963 | Skura | 156/140 |
| 3,302,795 | 2/1967 | Jacobs | 210/391 |
| 3,726,386 | 4/1973 | Chisholm | 198/33 AC |
| 3,991,631 | 11/1976 | Kapp | 74/231 MB |
| 3,995,506 | 12/1976 | Poe | 74/231 MB |
| 4,022,070 | 5/1977 | Wolfe | 156/139 |

*Primary Examiner*—C. J. Husar
*Assistant Examiner*—Conrad Berman
*Attorney, Agent, or Firm*—Charles E. Bricker

[57] ABSTRACT

Endless power transmission belts of spliceless, Mobius strip construction comprising a continuous strength member embedded in an elastomeric material, together with methods for the manufacture of such belts, are provided.

58 Claims, 21 Drawing Figures

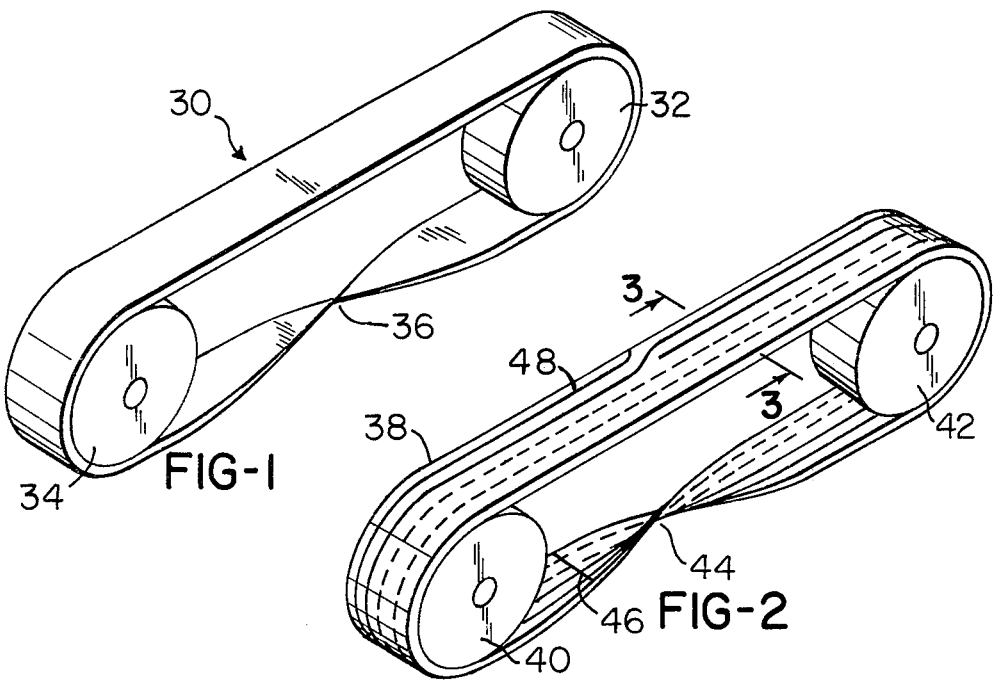
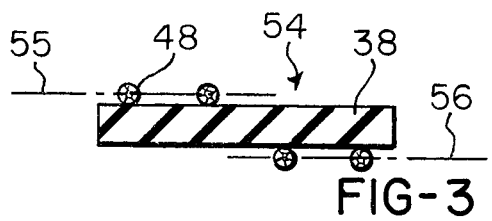 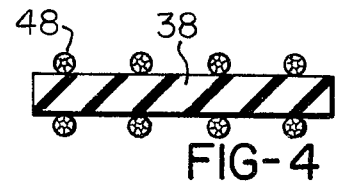
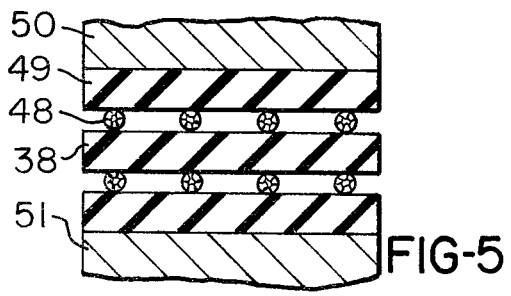 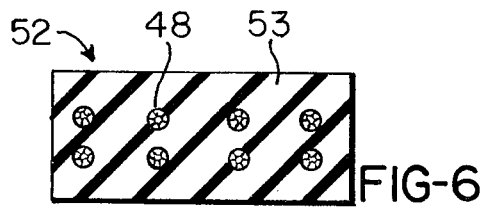
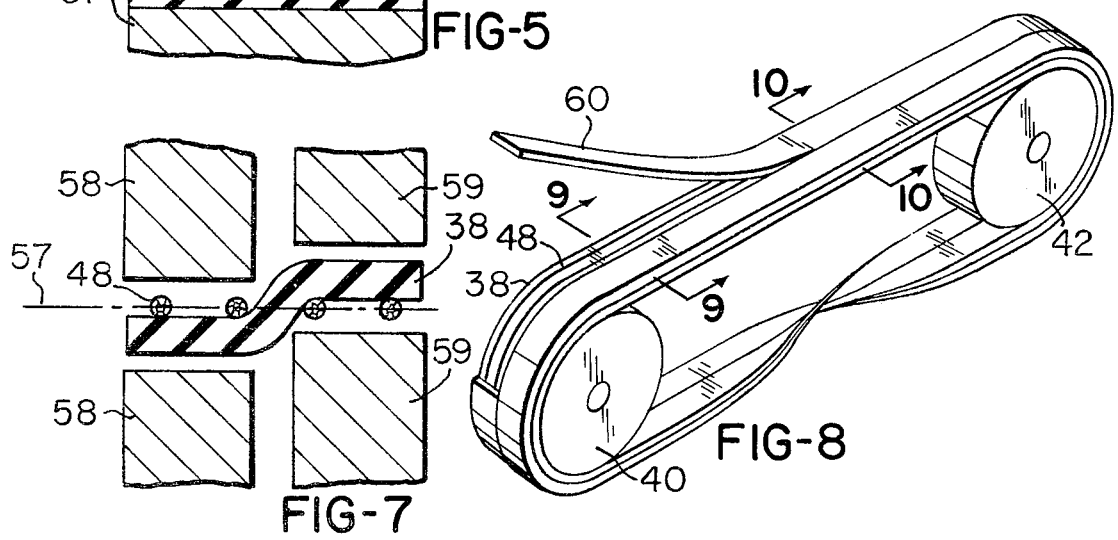

MOBIUS BELT AND METHOD OF MAKING THE SAME

BACKGROUND OF THE INVENTION

This invention relates to endless power transmission belts, and in particular, to endless power transmission belts of spliceless Mobius strip construction.

A "Mobius strip", named after the German astronomer and geometer August Ferdinand Mobius (1790–1868), has fascinated mathematicians and others for years. The Mobius strip is generally defined as a surface with only one side and one edge, made by placing a twist of 180 degrees in a long rectangular strip and then securing the ends of the strip together.

The Mobius strip principle has been utilized or proposed for various applications including the formation of endless belts and the like, as shown for example in U.S. Pat. Nos. 1,442,682, 2,479,929, 2,784,834 and 3,302,795. However, these previously proposed Mobius strip belts were of the type that were spliced to make the belt endless and, therefore, retained the undesirable characteristic of having a splice or point of joinder in the endless belt which is subject to surface and edge wear. U.S. Pat. No. 3,991,631 has proposed a Mobius belt of woven construction. However, woven construction is generally considered to be too expensive to be practical.

Accordingly, it is an object of this invention to provide an improved endless power transmission belt having an increased surface and edge wear potential, and which eliminates the splice therein and overcomes wear at the splice of the belt. Other objects, aspects and advantages of the present invention will be apparent to those skilled in the art from the following description when taken in conjunction with the accompanying drawings.

SUMMARY OF THE INVENTION

In accordance with the present invention, there is provided an endless belt of spliceless, Mobius strip construction comprising a continuous strength cord wrapped generally in the form of a helix of predetermined length and width and having a 180 degree turn at a given location along the length thereof, and a layer of an elastomeric material embedding the cord.

Also provided in accordance with the present invention is a process for making a spliceless, Mobius belt.

In accordance with one embodiment of the present invention, an endless belt of spliceless, Mobius strip construction is made by wrapping an elongate strip of elastomeric material around two spaced apart building supports, turning one end of the strip through 180 degrees and joining the two ends of the strip, thereby forming a Mobius strip, winding a continuous strength cord in the form of a helix around the Mobius strip and across the entire width thereof, winding at least one layer of elastomeric material over the cord winding to provide an assembly, and vulcanizing or otherwise curing the elastomeric material.

In accordance with another embodiment of the present invention an endless belt of spliceless, Mobius strip construction is made by wrapping an elongate strip of an elastomeric material around two spaced apart building supports, turning one end of the strip through 180 degrees and joining the two ends of the strip, thereby forming a Mobius strip, winding a continuous strength cord in the form of a helix around the Mobius strip and across one-half the width thereof, squeezing the cord into approximately a single plane, winding at least one layer of an elastomeric material around the cord winding to provide an assembly and vulcanizing or otherwise curing the assembly.

In accordance with yet another embodiment of the present invention, there is provided a process for making an endless belt of spliceless, Mobius strip construction which comprises the steps of wrapping an elongate strip of an elastomeric material around two spaced apart building supports, turning one end of the strip through 180 degrees and joining the two ends of the strip, thereby forming a Mobius strip, winding a continuous strength cord in the form of a helix around the Mobius strip and across one-half the width thereof, winding at least one layer of an elastomeric material around the cord winding to provide an assembly, passing the assembly between means for squeezing the cord into approximately a single plane, and vulcanizing or otherwise curing the assembly.

In accordance with a further embodiment of the present invention, there is provided a process for making an endless belt of spliceless, Mobius strip construction which comprises the steps of wrapping an elongate strip of a calendered cord fabric having a length equal to at least two times the length of the finished belt around two spaced apart building supports, turning one end of the strip through 180 degrees and joining the turned end to a portion of the strip and continuing to wrap the remainder of the strip around the building supports, winding at least one layer of an elastomeric material around the fabric to provide an assembly, and vulcanizing or otherwise curing the assembly.

In accordance with a yet further embodiment of the present invention, there is provided a process for making an endless belt of spliceless, Mobius strip construction which comprises the steps of providing a warp consisting essentially of at least one continuous warp cord wrapped generally in the form of a helix of predetermined length and width and having a 180 degree turn at a given location along the length thereof, winding at least one layer of an elastomeric material around the cord winding to provide an assembly and vulcanizing or otherwise curing the assembly.

BRIEF DESCRIPTION OF THE DRAWINGS

In the drawings:

FIG. 1 illustrates an endless belt of spliceless, Mobius strip construction;

FIGS. 2–6 illustrate one embodiment of the process of this invention;

FIGS. 7–11 illustrate another embodiment of the process of this invention;

DETAILED DESCRIPTION OF THE DRAWINGS

Figure 9:
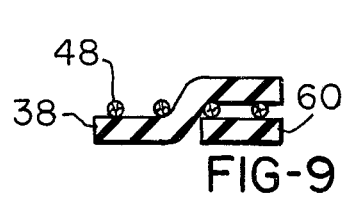

Referring now to the drawings, FIG. 1 illustrates an endless belt, generally indicated at 30, suitable for being rotated in either direction during use. The belt 30 would normally be suspended over and around at least two pulleys 32 and 34.

The belt 30 is of a spliceless, Mobius strip construction having a 180 degree turn 36 for providing, in effect, one spliceless continuous edge of twice the predetermined length of the belt during rotation thereof. The belt 30, as will hereinafter become apparent, comprises a continuous strength member embedded in an elastomeric material.

Referring now to FIGS. 2–6, and in accordance with one embodiment of the invention, the belt 30 may be made by first wrapping an elongate strip 38 of an elastomeric material around two spaced apart building drums 40 and 42, turning one end of the strip 38 through a 180 degree turn, as at 44, and butt splicing the two ends of the strip 38, as shown at 46, thus forming a Mobius strip. A strength cord 48 is wound in the form of a helix around the Mobius strip. As the cord is wound across the width of the Mobius strip it will appear, in cross-section, to be on opposite sides of the strip 38. For example, and as shown in FIG. 3, when the cord 48 is wound across one-half the width of the strip 38, the cord 48 appears, in cross-section, to be disposed along the top left side and along the bottom right side of the strip 38. It should be kept in mind that the Mobius strip has but a single side or surface and that the cord cross-sections are all disposed on that one surface. It should also be noted that the relative sizes of the elastomeric strip 38 and the cord 48, and the spacing of the cord 48 are exaggerated for the purpose of illustration.

The winding of the cord 48 is continued across the entire width of the strip 38, as shown in FIG. 4. A second elongate strip 49 of elastomeric material is then wound around the cord winding to provide the assembly shown in FIG. 5. This assembly is then vulcanized, or otherwise cured, by placing the same in a vulcanizing press between press platens 50 and 51, to provide a completed belt 52. During the vulcanizing step the first strip 38 and the second strip 49 coalesce, i.e., flow together, to provide an elastomeric body, now designated 53, completely surrounding and embedding the cord 48.

Figure 10:
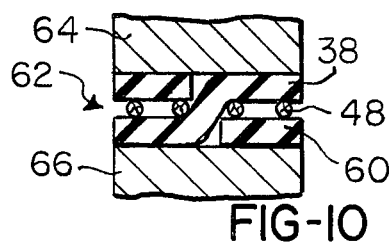
Figure 11:
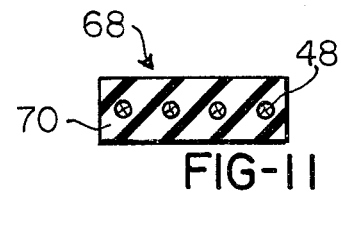
Figure 12:
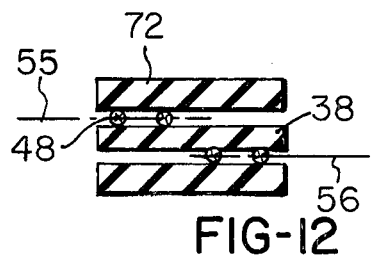
FIGS. 12–14 illustrate yet another embodiment of the process of this invention.
Figure 13:
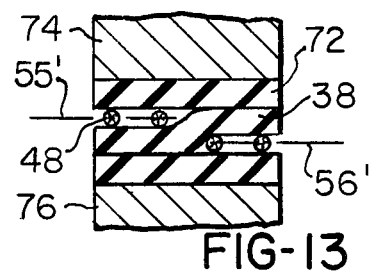

Referring now to FIGS. 2, 3 and 7–11, and in accordance with another embodiment of this invention, an elastomeric strip 38 is wound around building drums 40 and 42, one end is turned 180 degrees, as at 44, and the ends are butt spliced, as at 46. The cord 48 is wound around the Mobius strip and across about one-half the sub-assembly 54 shown in FIG. 3. The cord windings lie in planes 55 and 56. These cord windings are pressed into a single plane 57, by passing this sub-assembly 54 between offset roller pairs 58 and 59, as shown in FIG. 7. A narrow strip 60 of elastomeric material is wound over the cord windings, as shown in FIGS. 8–10, to provide an assembly 62. The assembly 62 is then vulcanized or otherwise cured, by placing the same in a vulcanizing apparatus between platens 64 and 66, to provide a completed belt 68. During the vulcanizing step, the first strip 38 and the narrow strip 62, flow together to provide an elastomeric body, designated 70, completely surrounding and embedding the cord 48, as shown in FIG. 11.

Figure 14:
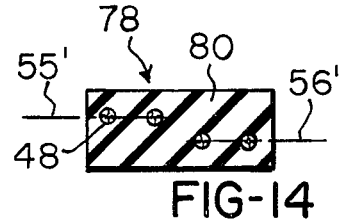

Another embodiment of the invention is shown in FIGS. 2, 3 and 12–14. In accordance with this embodiment, an elongate, elastomeric strip 72, having a width approximately equal to the width of the strip 38, is wound around the cord 48 of the sub-assembly 54. The resulting assembly is vulcanized, or otherwise cured, by pressing the same in a vulcanizing press between press platens 74 and 76 to provide a completed belt 78. During the vulcanizing step, the elastomeric strips 38 and 68 flow together to provide an elastomeric body, designated 80, completely surrounding and embedding the cord 48. Also during the vulcanizing step, the cord planes 55 and 56 are shifted closer together to planes 55' and 56', as shown in FIG. 14, and may or may not be shifted to a single cord plane, depending upon the plasticity of the elastomeric compound.

Figure 15:
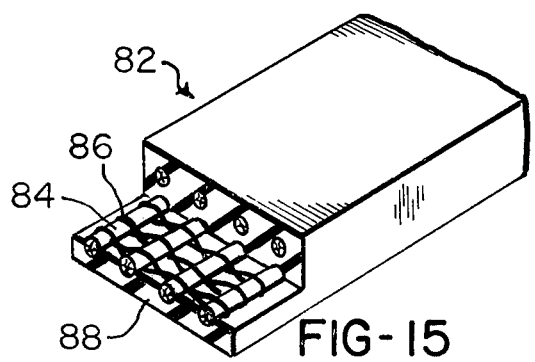
FIG. 15 illustrates a further embodiment of the process of this invention.

Referring now to FIG. 15, a further embodiment of the invention is made by wrapping an elongate strip of cord fabric having a length at least equal to two times the length of the finished belt around two building drums, turning one end of the strip through 180 degrees, joining the turned end to a portion of the remaining strip, continuing to wrap the remainder of the strip around the thus-formed loop, winding at least one layer of an elastomeric material around the cord fabric to provide an assembly, and vulcanizing, or otherwise curing, the assembly to provide a finished belt 82. The cord fabric comprises a plurality of generally parallel strength members 84, held in parallel relation by a plurality of interwoven, relatively weak tie members 86. The cord fabric is disposed so that the strength members 84 are parallel to the longitudinal axis of the belt 82. A layer of elastomer 88 is wound around the layers of cord fabric and the resulting assembly is then vulcanized, or cured. It is generally preferred that the cord fabric used to make the belt 82 have a thin layer of elastomeric material calendered thereto.

Figure 16:
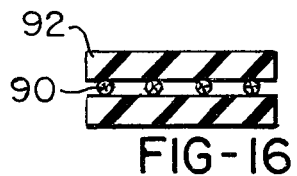
FIG. 16 illustrates yet a further embodiment of the process of the present invention.
Figure 17:
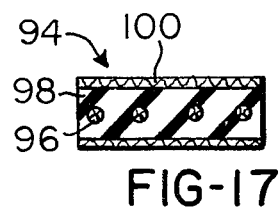
FIG. 17 illustrates another embodiment of the belt of this invention.
Figure 18:
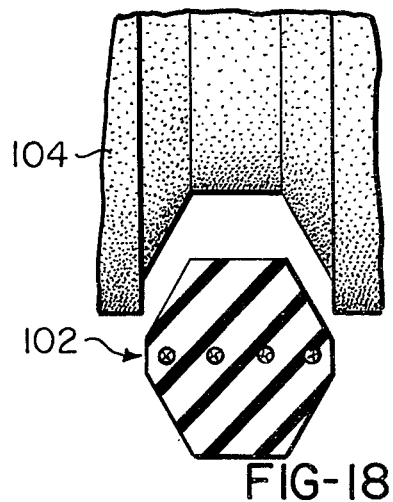
FIGS. 18–21 illustrate further embodiments of the belt of this invention.

A yet further embodiment of the invention is shown in FIG. 16. A belt having the appearance of the belt 68, shown in FIG. 11, can be made by winding a continuous warp cord 90, generally in the form of a helix of predetermined length and width, and having a 180 degree turn at a given location along its length, around two building supports or drums, winding at least one layer of elastomeric material 92 around the cord winding, and vulcanizing the resulting assembly.

Other embodiments of the belt of this invention are shown in FIGS. 17–21. The belt 94, shown in FIG. 17 comprises a continuous cord 96 strength member embedded in and surrounded by an elastomer 98 and having an outside fabric cover 100 which defines the continuous surface of the belt 94. The fabric cover 100 is applied over the outer most elastomeric layer prior to the vulcanizing step in order to bond the fabric to the elastomeric material. The belts 52, 78 and 82 shown in FIGS. 6, 14 and 15, respectively, may also have a fabric cover.

Endless belts having cross-sections other than a flat cross-section may also be made in accordance with the invention. The belt 102, shown in FIG. 18, has a cross-section known in the art as a "double-V". The belt 102 may be made by grinding the inverted "V" profile using a profiled grinding wheel 104.

Figure 19:
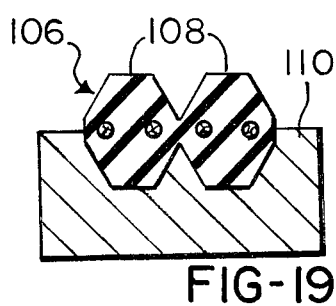

The belt 106, shown in FIG. 19, is known in the art as a multi-rib belt and, in the embodiment shown, has two truncated ribs 108. The belt 106 is shown being molded and vulcanized in a mold 110, only one-half of the mold being illustrated for clarity of illustration.

Figure 20:
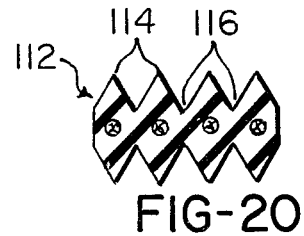

The belt 112, shown in FIG. 20, is known in the art as a "double V-ribbed" belt and comprises a plurality of V-shaped ribs defined by a plurality of alternating projections 114 and recesses 116. The belt 112 may be made by grinding, or molding, or a combination of molding and grinding.

Figure 21:
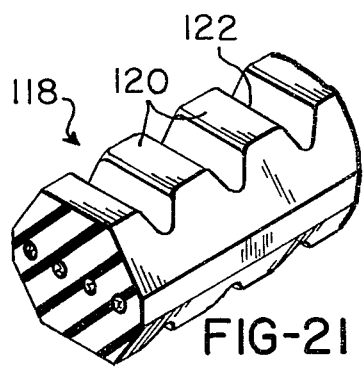

The belt 118, shown in FIG. 21, is a "toothed double-V" belt having a plurality of teeth defined by alternating transverse projections 120 and recesses 122 along the endless path of the belt.

The cords 48 and 90 employed in the various embodiments of this invention can be made of any material, natural or synthetic, known in the art, such as, for example, cotton, rayon, nylon, polyester, aramid, and the like.

The terms "elastomer" and "elastomeric material", as used herein and in the claims, are intended to include both natural and synthetic, thermosetting and thermoplastic materials having elastomeric properties. The thermosetting materials must be vulcanized, or otherwise cured, in order to have useful elastomeric properties. The most common thermosetting elastomeric material is rubber, either natural or synthetic, and the preferred rubber is neoprene. Suitable thermoplastic elastomers include the polyurethanes and EPDM.

The fabric 100 used in making the belt 94 can be any fabric known in the art.

Reasonable modifications are possible within the spirit of the disclosure without departing from the scope of the following claims.

I claim:

1. A process for making an endless belt of spliceless, Mobius strip construction which comprises the steps of:
    (a) wrapping an elongate strip of elastomeric material around two spaced apart building supports;
    (b) turning one end of said strip through 180 degrees;
    (c) joining the two ends of said strip, thereby forming a Mobius strip;
    (d) winding a continuous strength cord in the form of a helix around said Mobius strip and across the entire width thereof, thereby providing, in effect, two layers of cord winding;
    (e) winding at least one layer of an elastomeric material around said cord winding to provide an assembly; and
    (f) applying heat and pressure to said assembly to make said elastomeric material flowable and to surround and embed said cord.

2. The process of claim 1 further comprising the step of winding at least one layer of fabric around said assembly provided in said step (e) and thereafter carrying out said step (f).

3. The process of claim 1 wherein said step (f) is carried out using a profiled mold whereby the continuous surface of the finished belt has at least one inverted V profile.

4. The process of claim 1 further comprising the step of grinding the continuous surface of the finished belt into at least one inverted V profile.

5. The process of claim 1 wherein all said elastomeric material is a vulcanizable rubber and said step (f) comprises applying heat and pressure to vulcanize and coalesce said rubber, thereby embedding said cord.

6. The process of claim 5 wherein said rubber is neoprene.

7. The process of claim 1 wherein all said elastomeric material is a thermoplastic material and said step (f) comprises applying heat and pressure to coalesce said thermoplastic material, thereby embedding said cord.

8. The process of claim 7 wherein said thermoplastic material is a polyurethane.

9. The process of claim 7 wherein said thermoplastic material is EPDM.

10. A process for making an endless belt of spliceless, Mobius strip construction which comprises the steps of:
    (a) wrapping an elongate strip of an elastomeric material around two spaced apart building supports;
    (b) turning one end of said strip through 180 degrees;
    (c) joining the two ends of said strip, thereby forming a Mobius strip;
    (d) winding a continuous strength cord in the form of a helix around said Mobius strip and across one-half the width thereof;
    (e) passing said cord-wound strip between means for squeezing said cord into approximately a single plane;
    (f) winding at least one layer of an elastomeric material around said cord winding to provide an assembly; and
    (g) applying heat and pressure to said assembly to make said elastomeric material flowable and to surround and embed said cord.

11. The process of claim 10 further comprising the step of winding at least one layer of fabric around said assembly provided in said step (f) and thereafter carrying out said step (g).

12. The process of claim 10 wherein said step (f) is carried out using a profiled mold whereby the continuous surface of the finished belt has at least one inverted V profile.

13. The process of claim 10 further comprising the step of grinding the continuous surface of the finished belt into at least one inverted V profile.

14. The process of claim 10 wherein all said elastomeric material is a vulcanizable rubber and said step (g) comprises applying heat and pressure to vulcanize and coalesce said rubber, thereby embedding said cord.

15. The process of claim 14 wherein said rubber is neoprene.

16. The process of claim 10 wherein all said elastomeric material is a thermoplastic material and said step (g) comprises applying heat and pressure to coalesce said thermoplastic material, thereby embedding said cord.

17. The process of claim 16 wherein said thermoplastic material is a polyurethane.

18. The process of claim 16 wherein said thermoplastic material is EPDM.

19. A process for making an endless belt of spliceless, Mobius strip construction which comprises the steps of:
    (a) wrapping an elongate strip of an elastomeric material around two spaced apart building supports;
    (b) turning one end of said strip through 180 degrees;
    (c) joining the two ends of said strip, thereby forming a Mobius strip;
    (d) winding a continuous strength cord in the form of a helix around said Mobius strip and across one-half the width thereof;
    (e) winding at least one layer of an elastomeric material around said cord winding to provide an assembly;
    (f) passing the said assembly between means for squeezing said cord into approximately a single plane; and (g) applying heat and pressure to said assembly to make said elastomeric material flowable and to surround and embed said cord.

20. The process of claim 19 further comprising the step of winding at least one layer of fabric around said assembly provided in said step (c) and thereafter continuing with said step (f).

21. The process of claim 19 wherein said step (f) is carried out using a profiled mold whereby the continuous surface of the finished belt has at least one inverted V profile.

22. The process of claim 19 further comprising the step of grinding the continuous surface of the finished belt into at least one inverted V profile.

23. The process of claim 19 wherein all said elastomeric material is a vulcanizable rubber and said step (g) comprises applying heat and pressure to vulcanize and coalesce said rubber, thereby embedding said cord.

24. The process of claim 23 wherein said rubber is neoprene.

25. The process of claim 19 wherein all said elastomeric material is a thermoplastic material and said step (g) comprises applying heat and pressure to coalesce said thermoplastic material, thereby embedding said cord.

26. The process of claim 25 wherein said thermoplastic material is a polyurethane.

27. The process of claim 25 wherein said thermoplastic material is EPDM.

28. A process for making an endless belt of spliceless, Mobius strip construction which comprises the steps of:
  (a) wrapping an elongate strip of calendered cord fabric having a length equal to at least two times the length of the finished belt around two spaced apart building supports;
  (b) turning one end of said strip through 180 degrees;
  (c) joining said turned end to a portion of said strip to form a closed loop and continuing to wrap the remainder of said strip around the thus-formed loop;
  (d) winding at least one layer of an elastomeric material around said cord fabric to provide an assembly; and
  (e) applying heat and pressure to said assembly to make said elastomeric material flowable and to surround and embed said cord fabric.

29. The process of claim 28 further comprising the step of winding at least one layer of fabric around said assembly provided in said step (d) and thereafter carrying out said step (e).

30. The process of claim 28 wherein said step (f) is carried out using a profiled mold whereby the continuous surface of the finished belt has at least one inverted V profile.

31. The process of claim 28 further comprising the step of grinding the continuous surface of the finished belt into at least one inverted V profile.

32. The process of claim 28 wherein said elastomeric material is a vulcanizable rubber and said step (d) comprises applying heat and pressure to vulcanize and coalesce said rubber, thereby embedding said cord fabric.

33. The process of claim 32 wherein said rubber is neoprene.

34. The process of claim 28 wherein said elastomeric material is a thermoplastic material and said step (e) comprises applying heat and pressure to coalesce said thermoplastic material, thereby embedding said cord.

35. The process of claim 34 wherein said thermoplastic material is a polyurethane.

36. The process of claim 34 wherein said thermoplastic material is EPDM.

37. A process for making an endless belt of spliceless, Mobius strip construction which comprises the steps of:
  (a) providing a warp consisting essentially of at least one continuous warp cord wrapped generally in the form of a helix of predetermined length and width and having a 180 degree turn at a given location along the length thereof;
  (b) winding at least one layer of an elastomeric material around said cord winding to provide an assembly; and,
  (c) applying heat and pressure to said assembly to make said elastomeric material flowable and to surround and embed said cord.

38. The process of claim 37 further comprising the step of winding at least one layer of fabric around said assembly provided in said step (b) and thereafter carrying out said step (c).

39. The process of claim 37 wherein said step (f) is carried out using a profiled mold whereby the continuous surface of the finished belt has at least one inverted V profile.

40. The process of claim 37 further comprising the step of grinding the continuous surface of the finished belt into at least one inverted V profile.

41. The process of claim 37 wherein said elastomeric material is a vulcanizable rubber and said step (c) comprises applying heat and pressure to vulcanize and coalesce said rubber, thereby embedding said cord.

42. The process of claim 41 wherein said rubber is neoprene.

43. The process of claim 37 wherein said elastomeric material is a thermoplastic material and said step (c) comprises applying heat and pressure to coalesce said thermoplastic material, thereby embedding said cord.

44. The process of claim 43 wherein said thermoplastic material is a polyurethane.

45. The process of claim 43 wherein said thermoplastic material is EPDM.

46. An endless belt of spliceless, Mobius strip construction having a 180 degree turn in the surfaces thereof for providing, in effect, one spliceless continuous surface and one spliceless continuous edge of twice the predetermined length of said belt comprising a continuous strength cord wrapped generally in the form of a helix of predetermined length and width and having a 180 degree turn along the length thereof, and an elastomeric material embedding and surrounding said cord.

47. The belt of claim 46 wherein said cord is wrapped across the entire width of said belt, thereby providing two layers of cord.

48. The belt of claim 46 further comprising a layer of fabric bonded to said elastomeric material and defining said continuous surface.

49. The belt of claim 46 wherein said cord is wrapped across one-half the width of said belt, thereby providing a single layer of cord.

50. The belt of claim 49 wherein all of the helical windings of said cord lie in approximately the same plane.

51. The belt of claim 49 wherein the helical windings of said cord lie in two distinct planes.

52. The belt of claim 46 wherein said continuous surface has at least one inverted V profile.

53. The belt of claim 52 further comprising a plurality of transverse projections and recesses along the endless path of said belt.

54. The belt of claim 46 wherein said elastomeric material is a vulcanizable rubber.

55. The belt of claim 54 wherein said rubber is neoprene.

56. The belt of claim 46 wherein said elastomeric material is thermoplastic.

57. The belt of claim 56 wherein said thermoplastic material is a polyurethane.

58. The belt of claim 56 wherein said thermoplastic material is EPDM.

* * * * *

UNITED STATES PATENT AND TRADEMARK OFFICE
CERTIFICATE OF CORRECTION

PATENT NO. : 4,253,836

DATED : March 3, 1981

INVENTOR(S) : Joseph P. Miranti, Jr.

It is certified that error appears in the above—identified patent and that said Letters Patent is hereby corrected as shown below:

Claim 20, line 3, "(c)" should read -- (e) --.

Claim 32, line 2, "(d)" should read -- (e) --.

Signed and Sealed this

Fourth Day of August 1981

[SEAL]

Attest:

GERALD J. MOSSINGHOFF

Attesting Officer

Commissioner of Patents and Trademarks